United States Patent [19]

Urick et al.

[11] 4,093,934
[45] June 6, 1978

[54] FREE-FALLING SONOBUOY

[75] Inventors: Robert J. Urick, Silver Spring, Md.;
Robert L. Parris, Annandale, Va.

[73] Assignee: The United States of America as represented by the Secretary of the Navy, Washington, D.C.

[21] Appl. No.: 452,460

[22] Filed: Apr. 28, 1965

[51] Int. Cl.² .......................... H04B 11/00; G01S 9/66
[52] U.S. Cl. ........................................ 340/2; 340/6 R; 340/3 R
[58] Field of Search ................... 340/2, 3, 6, 6 R, 3 R

[56] References Cited

U.S. PATENT DOCUMENTS 3,174,128  3/1965  Dow et al. ............................ 340/3 R

*Primary Examiner*—Richard A. Farley

EXEMPLARY CLAIM

1. The method of detecting underwater vessels comprising the steps of:
    submerging a hydrophone array characterized by its ability to receive sound emanating from vessels in the annular zone defined by a conical pencil of rays upwardly divergent from the array and a hydrophone array characterized by its ability to receive sound emanating from vessels in the annular zone defined by a conical pencil of rays downwardly divergent from the array,
    lowering said hydrophone arrays to extreme water depths,
    and continuously transmitting signals of any sound waves thereby received to the surface during the lowering of said arrays,
    whereby a complete acoustic scan of the entire volume of the sea out to substantial ranges is thus acquired.

9 Claims, 3 Drawing Figures

U.S.Patent  June 6, 1978  4,093,934

FREE-FALLING SONOBUOY

The invention described herein may be manufactured and used by or for the Government of the United States of America for governmental purposes without the payment of any royalties thereon or therefor.

This invention relates to a novel method of long range detection, surveillance and communication by means of sonobuoys operating in the deep sea and more particularly to a specialized sonobuoy for its practice.

Sound responsive detection buoys, or sonobuoys, have been used in attacking enemy submarines known to be within a reasonably restricted area, and have proved valuable in such a use. In general, these buoys are dropped from airplanes and comprise a battery-powered radio transmitter which is modulated by a hydrophone to enable an operator in an attacking airplane to hear the ocean noises at the location of the buoy and to thus locate the submarine.

Present sonobuoys in existing or contemplated production operate only between depths of 60 and 1500 feet. At these depths they are limited in their performance by the acoustic paths existing in deep water, which restrict the range operation to comparatively short distances. At the extreme depths of 12,000 feet and below various buoys that are in preliminary development utilize direct paths which are similarly limited by acoustic paths in the deep sea. Because of these path limitations, existing sonobuoys provide only a restricted range coverage that greatly restricts their usefulness in long range detection, communication and surveillance applications.

The propagation of sound in sea water is known to occur along rays which are subject to refraction by variation in sound velocity. In most areas of the oceans, the velocity of sound varies directly with the pressure and temperature of the water, the pressure of course increasing with the depth. The temperature varies over a wide range near the surface and decreases rather rapidly to a temperature of near freezing several thousand feet below the surface. Therefore, near the surface of the ocean, the temperature of the water affects the propagation rate more than the pressure, so that the propagation rate becomes slower as the depth increases to this point. Under these conditions, the lower edge of the sound wave moves slower than the upper edge so that the sound wave is progressively refracted toward the bottom of the ocean and does not move outward in a straight line.

At a depth of several thousand feet, the temperature becomes quite low and thereafter decreases very slowly, so that the increasing pressure with depth thereafter becomes predominant and increases the propagation rate. The sound waves initiated near the surface are thus re-refracted toward the surface.

As a result of the rays being refracted to form continuous reversely bent paths which extend in a generally horizontal direction, there occurs little loss of energy. This feature persists to a useful extent even though there occurs considerable deviation. Sound signals occurring along such reversely bent rays may in this way, therefore, be transmitted over distances of several thousand miles.

The present invention is a method for detecting the presence of enemy submarines which involves a novel search-in-depth concept of acoustic ranging, and provides a specialized sonobuoy for its practice. The sonobuoy is adapted to sink to substantial depths. It carries a linear array of hydrophone elements placed in a flexible sleeve in order to permit packaging in a folded condition within a standard sonobuoy canister. After water entry the array is extended. The hydrophones therein are arranged to receive acoustic signals in two directions so as to form annuli at the intersection of the water surface. Received signals are sent over a cable to a float and transceiver on the surface.

This unique method of operating the device as it falls under the action of gravity provides an acoustic scan of the entire volume of the sea out to substantial ranges. At shallow depths, the annulus from the upwardly directed beam is close in and that from the downwardly directed beam is far out, but as the buoy sinks, the upward beam scans outwardly and the downward beam scans inwardly.

Accordingly, one of the objects of the present invention is to provide a method of long range detection, surveillance, and communication by means of sonobuoys operating in deep sea.

Another of the objects is to provide a method of acoustic ranging in which acoustic signals are received in two directions, upwardly and downwardly divergent in all azimuthal directions, progressively from a point on the surface of the water to a point at the ocean bottom.

Still another object is to provide a freely falling sonobuoy containing an array of hydrophone elements arranged to receive acoustic signals in two directions, one divergent upwardly and the one divergent downwardly in all azimuthal directions, to provide an acoustic scan of the entire volume of the sea out to substantial ranges.

Still other objects, advantages and improvements will be apparent from the following description taken in connection with the accompanying drawings wherein.

Figure 1:
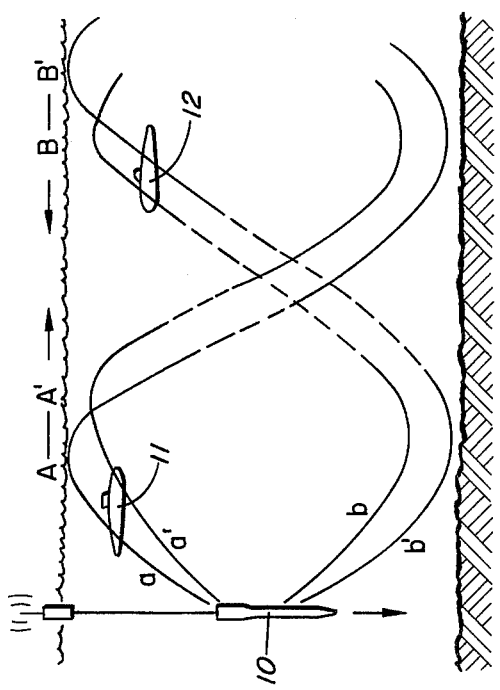
FIG. 1 is a graphic representation of a free-falling sonobuoy and the unique ray transmission characteristics of sound in the deep sea.

The search-in-depth concept of acoustic ranging according to the present invention is basically a way of taking advantage of certain unique transmission characteristics of sound in the deep sea. These characteristics are best described by ray diagrams showing the distribution of sound in the sea, and illustrated in FIG. 1 of the drawings. At any particular depth an annulus AA' is insonified via a pencil of ray $aa'$ leaving the buoy 10 in an upward direction. At that same depth an annulus BB' is insonified via rays $bb'$ leaving the buoy at downward angles. Sound radiated by a target in annulus AA', such as for example, submarine 11, reaches the buoy via the rays $aa'$ and the sound of a target in the more distant zone BB', such as submarine 12, reaches the buoy within rays $bb'$. These are highly favorable acoustic paths inasmuch as they form convergence zones, or caustics, near the surface. When the buoy 10 is at a shallow depth, zone AA' lies at a range of a mile or two and zone BB' lies, in much of the deep waters of the ocean, at a range of 30 to 35 miles. As the buoy falls, it may be seen that zone AA' moves outward and zone BB' moves inward as shown by the arrows of FIG. 1, until, at a depth of 12,000 feet or less, the two zones come together. Thus, during descent, complete range coverage is had over internal acoustic paths in the sea involving no reflections from the sea surface or bottom, and over which a convergence gain in transmission of between 6 and 20 db is had over what would be obtained in straight-line propagation.

Figure 2:
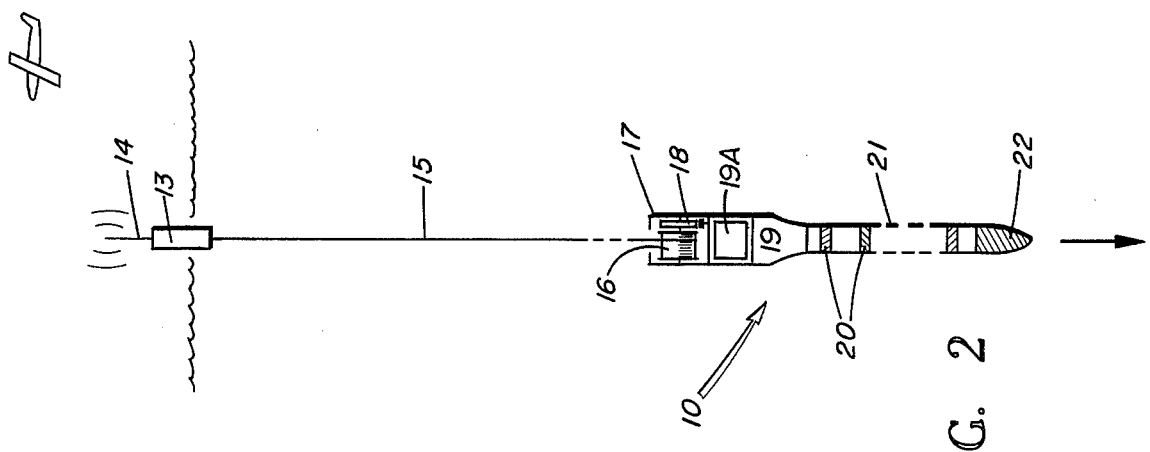
FIG. 2 is an elevational view of a passive sonobuoy formed according to the present invention.

Referring now to FIG. 2 there is diagrammatically shown a passive version of a sonobuoy 10 constructed in accordance with the present invention for performing the search-in-depth concept of acoustic ranging. The numeral 13 designates a float containing a radio transceiver having an antenna 14, conventional in every essential way with existing sonobuoys. The float 13 is attached to the main body of the sonobuoy by a small one or two-conductor cable which is wound upon a drum 16 positioned within a canister 17 and adapted to be payed out from the canister as the unit sinks, for carrying electrical signals to the surface. Drum 16 contains about 13,000 feet of cable wound thereon so as to pay out freely during descent, and is provided with a brake and clamp 18 which stops or continues the descent of the buoy when actuated by a command radio signal sent from the aircraft and transmitted down the cable through an electronics unit 19 to a conventional brake actuating means 19A. Thus, provision is made for operation at various fixed depths during the descent for the purpose of monitoring signals received during the descending mode. The electronics unit 19 comprises a preamplifier for operation into and out of the cable 15 and beam-forming networks for the hydrophone array 20.

The numeral 20 designates a linear array of hydrophone or transducer elements placed within a flexible sleeve 21 so as to permit packaging folded-up accordionwise in a standard sonobuoy canister. When the horizontal direction of a target signal is required, a number of such vertical arrays will be utilized together with additional beam-forming networks to provide directional information. In addition, a flux gate or other kind of compass may be included in the electronics unit 19 to provide the north-south orientation of the unit. Flexible sleeve 21 may be composed of any suitable material which is free-flooding upon extension soon after water entry, thus reducing the turbulence effect and the noise factor. A weight 22 is attached to the flexible sleeve 21 for erecting the hydrophone array and carrying the whole unit downward at a desired rate of descent.

Figure 3:
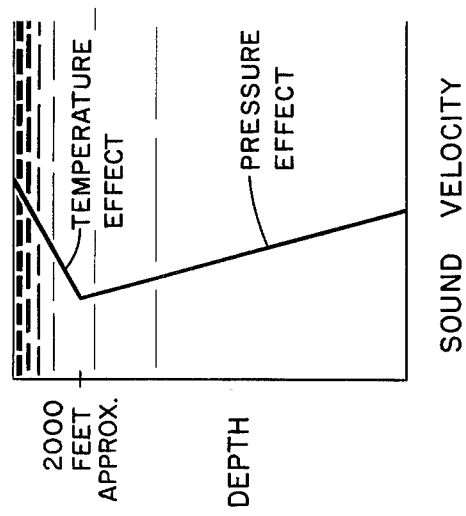
FIG. 3 is a graph of sound velocity versus water depth.

The graph of FIG. 3 illustrates the typical sound wave velocity versus depth characteristics in a part of the world where the temperature near the surface of the water is warmer than at greater ocean depths. This sound velocity will, beginning at the depth of the sound source, begin to decrease with a decrease in pressure until a depth of about 2,000 feet is reached. At this point there is an increase in sound velocity dur to the temperature effect as explained above. FIG. 3 is characteristic of only certain ocean areas, and for some polar areas such a graph would not reveal a change in sound velocity due to the surface temperature effect.

Thus, taking advantage of the sound transmission characteristics described in FIGS. 1 and 3, the sonobuoy of this invention forms two beams, one directed angularly-upward and one directed angularly-downward, by conventional methods, enabling the buoy to acoustically "see" in the directions of the rays $aa'$ and $bb'$, as shown in FIG. 1. Signals arriving in these two directions are amplified and transmitted separately to the aircraft by conventional modulation, multiplexing, or time-sharing techniques. The purpose of the beam formation is twofold: first, to discriminate against noise arriving at the hydrophone array in undesired directions and to enhance signals arriving within the desired directions; and second, to provide information, in the aforedescribed passive application, as to the range from which the particular signal is coming.

The essential feature of a sonobuoy constructed in accordance with the search-in-depth concept is that it is operational while if falls, gravity, from near the surface to a depth of about 12,000 feet in deep water. Although only a passive version has been described, it should be apparent that both passive and active versions are available, depending upon whether the sound radiated by a desired target, or an echo reflected from it, is utilized. An active sonobuoy utilizes echoes generated by a transmitting unit that is a part of the buoy and which generates acoustic energy through conventional techniques. Alternatively, explosive charges may be used for this purpose, either attached to and forming a part of the buoy until released by radio command, or else as entirely separated charges dropped by the control aircraft. In addition, it is not intended that the invention be limited to aircraft-dropped embodiments, but rather it is contemplated that it could be practiced in the same manner in being deployed from hydrofoil surface vessels or the like. It may thus be seen that the present invention provides a new method of detection, surveillance, and communication by means of specially adapted sonobuoys operated in the deep sea.

While a preferred embodiment of the invention has been shown, it should be understood that various changes and modifications may be resorted to, in keeping with the spirit of the invention as defined by the appended claims.

What is claimed is:

1. The method of detecting underwater vessels comprising the steps of:
    submerging a hydrophone array characterized by its ability to receive sound emanating from vessels in the annular zone defined by a conical pencil of rays upwardly divergent from the array and a hydrophone array characterized by its ability to receive sound emanating from vessels in the annular zone defined by a conical pencil of rays downwardly divergent from the array,
    lowering said hydrophone arrays to extreme water depths,
    and continuously transmitting signals of any sound waves thereby received to the surface during the lowering of said arrays,
    whereby a complete acoustic scan of the entire volume of the sea out to substantial ranges is thus acquired.

2. The method of detecting underwater vessels comprising the steps of:
    submerging a transducer characterized by its ability to transmit sound waves therefrom and to receive said sound waves thereafter reflected from vessels positioned within the annular zone defined by a conical pencil of rays upwardly divergent from the array and a transducer characterized by its ability to transmit sound waves therefrom and receive said sound waves thereafter reflected from vessels positioned within the annular zone defined by a conical pencil of rays downwardly divergent from the array,
    lowering said transducer to extreme water depths, and continuously transmitting signals of the reflected sound waves received by the arrays to the surface during the lowering of said arrays, whereby a complete acoustic scan of the entire volume of the sea out to substantial ranges is thus acquired.

3. In an underwater vessel-detecting sonobuoy adapted to be dropped from an airplane, a floating buoy, a main weighted-unit supported by said buoy from a length of electrical cable contained within said unit and adapted to be payed out therefrom, a hydrophone array so arranged within said unit to receive sound waves emanating from vessels positioned within the annular zone defined by a conical pencil of ray upwardly divergent from the array, a hydrophone array so arranged within said unit to receive sound waves emanating from vessels positioned within the annular zone defined by a conical pencil of rays downwardly divergent from the array, means within said unit for amplifying and transmitting signals of any sound waves received through said cable to the buoy, and means within said buoy for transmitting said signal to the airplane, whereby upon lowering the unit to extreme water depths a complete acoustic scan of the entire volume of the sea out to substantial ranges is acquired.

4. The device of claim 3 wherein the centers of the annular zones defined by said conical pencils of rays lie upon a line substantially perpendicular to the surface of the water and passing through said main weighted-unit.

5. The device of claim 3 wherein said main weighted-unit contains brake and clamp means for controlling the payout of said electrical cable, and further including means for actuating said brake and clamp whereby the descent of the main weighted-unit may be stopped so that signals received at a particular depth may be monitored by the airplane.

6. The device of claim 3 wherein said main weighted-unit includes a flexible sleeve portion normally folded up accordionwise and adapted to be extended upon being dropped into the water thereby to erect the hydrophone arrays, said sleeve being free-flooding upon extension.

7. The device of claim 3 wherein said main weighted-unit further includes transducer means for transmitting sound waves to the underwater vessels to be detected, whereby said sound waves thereafter may be reflected from said vessels and received by said hydrophone arrays.

8. The method of detecting underwater vessels comprising the steps of, transmitting sound waves from an underwater station, receiving sound waves at the station from vessels in an annular zone defined by a conical pencil of rays disposed upwardly divergent from the station and vessels within an annular zone defined by a conical pencil of rays disposed downwardly divergent from the station and, communicating electrical signals indicative of the sound waves received to a remote station.

9. The method of detecting underwater vessels comprising the steps of, receiving sound waves from vessels within an annular zone defined by a conical pencil of rays disposed upwardly divergent from an underwater station and vessels within an annular zone defined by a conical pencil of rays disposed downwardly divergent from the underwater station, and communicating information of the received sound waves to a remote station.

* * * * *